United States Patent [19]

Clement et al.

[11] 3,764,813

[45] Oct. 9, 1973

[54] COORDINATE DETECTION SYSTEM

[75] Inventors: Frank John Clement, Aurora, Colo.; Barton Leigh Richardson, Matawan, N.J.

[73] Assignee: Bell Telephone Laboratories, Incorporated, Murray Hill, N.J.

[22] Filed: Apr. 12, 1972

[21] Appl. No.: 243,256

[52] U.S. Cl...... 250/221 R, 250/220 M, 340/173 LS

[51] Int. Cl. ........................................... H01j 39/12

[58] Field of Search.................... 250/221, 222, 223, 250/219 CR, 220 R, 220 M; 178/19; 340/146.3, 173 LS

[56] References Cited

UNITED STATES PATENTS

| | | | |
|---|---|---|---|
| 3,475,029 | 10/1969 | Hyman | 250/222 |
| 3,016,421 | 1/1962 | Harmon | 250/222 |
| 3,047,723 | 7/1962 | Knapp | 250/222 |
| 3,183,499 | 5/1965 | Cowen | 250/221 |
| 2,900,521 | 8/1959 | Eames | 250/221 |
| 3,478,220 | 11/1969 | Milroy | 250/221 |
| 3,234,512 | 2/1966 | Burkhart | 250/219 CR |

*Primary Examiner*—James W. Lawrence
*Assistant Examiner*—D. C. Nelms
*Attorney*—W. L. Keefauver

[57] ABSTRACT

In a coordinate detection system, the interruption of pulsed invisible light beams is used to determine the spatial coordinates of a passive stylus, such as a finger or a pencil, relative to an associated display. The system comprises a rectangular frame which houses two mutually perpendicular linear arrays of infrared light-emitting diodes and two perpendicular linear arrays of associated silicon detector diodes. Driving circuitry sequentially pulses the light emitters in repeating cycles. Associated detecting circuitry responds to the detectors and determines during each cycle the spatial coordinates of the interfering stylus. This spatial information is then coded and transmitted, if necessary. Sequential pulsing eliminates the need for beam collimating structures and lenses and allows for the application of high instantaneous power driving levels to the emitters.

11 Claims, 5 Drawing Figures

COORDINATE DETECTION SYSTEM

FIELD OF THE INVENTION

This invention relates to coordinate detection systems and, in particular, to such systems which utilize the interruption of crossing invisible light pulses for determining the spatial coordinates of a passive stylus.

BACKGROUND OF THE INVENTION

Present coordinate detection systems, many of which are used in computer interaction applications, are either of the indirect or direct interaction types. In one indirect interaction system, the desired operation is determined by observing the display. Thereafter, an associated keyboard is utilized for transmitting the relevant information to the computer. It is apparent that this system requires a visual back-and-forth routine which is distracting to the user.

In one direct interaction system, a hand-held electronic device picks up the coordinate information. This device has cables attached thereto which, again, tend to distract the user.

In light of the above, two desired features of a coordinate detection system are the ability to interact directly with the displayed information and the ability to point with any passive or nonelectronic object, such as a finger or a pencil. One system having these two features is the touch-sensitive wire system wherein crossed wires are laid flat on the display. These touch wires, although very fine, are visible to the naked eye and thus tend to obstruct the displayed information. Secondly, since the user can see the wire intersections, he feels he must touch particular wire intersections rather than concentrate exclusively on the displayed information.

One direct interaction system described in an article entitled "Crossed Light Beam Bridge Operator/Display Interface", *Electronics*, Oct. 11, 1971, utilizes the interruption of continuously ON infrared light beams to determine the spatial coordinates of a passive stylus. This system, however, provides only limited beam intensities and, therefore, does not afford good signal-to-noise performance at the associated detectors. Secondly, this system requires the use of complex collimating structures and lenses.

It is therefore an object of the present invention to provide a coordinate detection system which is applicable to computer interaction techniques.

It is another object of this invention to allow for direct interaction with the displayed information.

It is a further object of this invention to allow system operation with any passive stylus, such as a finger or a pencil.

SUMMARY OF THE INVENTION

According to the present invention, a coordinate detection system comprises a rectangular frame which houses two mutually perpendicular linear arrays of infrared light-emitting diodes and two perpendicular linear arrays of associated silicon detector diodes. The frame is placed adjacent to an associated display while each emitter array faces an associated detector array. The arrangement is such that light emitted by each emitter is principally directed at a single associated detector. Driving circuitry sequentially pulses the light-emitting diodes in repeating cycles while associated detecting circuitry responds to the detector output signals. During each scan cycle, the detecting circuitry determines which pair, if any, of the detectors failed to receive light from their associated emitters. In other words, the interruption of a pair of perpendicular light pulses by a passive stylus during a given cycle is determined by two mutually perpendicular detectors. The detection circuitry then responds to these detectors to provide the corresponding coordinate information in appropriate form. The spatial information can then be coded and transmitted, if necessary.

According to a specific embodiment of this invention, the number of X emitters is less than the number of Y emitters. Special circuitry compensates for this inequality of emitters by making it appear to the detecting circuitry that there exists a square array of emitters when, in fact, such is not the case. A non-square emitter array will result, of course, when the display itself is non-square. Further, associated X and Y emitters are serially connected and simultaneously pulsed by the successive line outputs of a single multistage shift register. Finally, the output signals of groups of detectors are applied to individual output transistors. Connecting associated X and Y emitters in series and grouping the detectors results in substantial circuit economy and simplicity.

It is an advantage of the present invention that user distractions are substantially eliminated.

It is an advantage of this invention that close diode spacing can be achieved.

It is a further advantage of this invention that complex collimating structures and lenses are not required.

It is a still further advantage of this invention that it allows for high-power emitter driving levels thereby providing improved signal-to-noise performance over that provided by continuously ON coordinate detection systems.

It is a feaure of this invention that it utilizes the interruption of crossing infrared light pulses for determining the spatial coordinates of a passive stylus relative to an associated display.

It is another feature of this invention that it utilizes sequential pulsing of infrared emitters to effect scanning of the overall coordinate field.

BRIEF DESCRIPTION OF THE DRAWING

The above and other objects, advantages, and features of this invention will be better appreciated by a consideration of the following detailed description and the drawing in which:

FIGS. 2A-1 and 2A-2 show a detailed embodiment of a coordinate detection system according to the present invention, FIG. 2B shows the associated frame, while FIG. 2C is used to explain the particular circuit of FIG. 2A.

DESCRIPTION OF THE DRAWING

Figure 1:
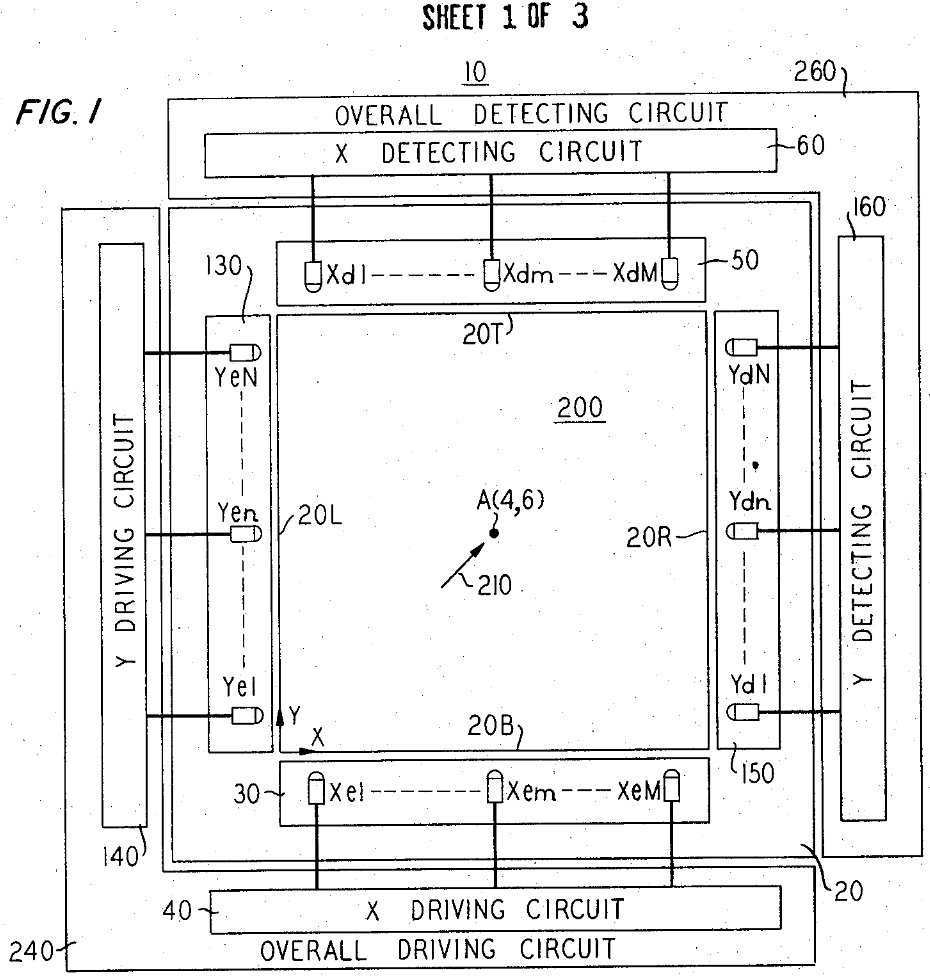
FIG. 1 broadly illustrates a coordinate detection system according to the present invention.

FIG. 1 generally illustrates a coordinate detection system according to the present invention. A broad object of this system is to allow direct interaction with the information displayed on screen or display 200. Coordinate detection system 10 generally comprises rectangular frame 20 having the following four sides: horizontal sides 20B (bottom) and 20T (top), and vertical sides 20L (left) and 20R (right). Frame 20 is placed adjacent to associated display 200, which can be a television screen, a microfilm screen, a cathode ray tube, etc. Pressing against display 200 at point A is wooden pointer 210. It is therefore a specific object of system 10 to determine the coordinate location of wooden pointer 210 (i.e., point A) relative to the face of display 200.

Mounted on side 20B of frame 20 is a first linear array 30 of light emitters, designated from left to right as $X_{el}...X_{em}...X_{eM}$, where M is the total number of such emitters. Shown on the lower left-hand portion of frame 20 are X and Y coordinate axes. These emitters lie along the X axis and, therefore, are designated as X emitters; however, they are aimed in the positive Y direction. These emitters are advantageously light-emitting diodes which produce infrared light in response to an input electrical signal. In summary, the X and Y emitters respectively direct their light towards sides 20T and 20R of frame 20. It is apparent that the total number, M, of X emitters is not necessarily equal to the total number, N, of Y emitters; a non-square emmiter array, of course, results from the fact that the associated display itself is non-square. This aspect will be further discussed with respect to FIG. 2A. Similarly, mounted on side 20L of frame 20 is a second linear array 130 of light emitters, designated from bottom to top as $Y_{e1}...Y_{en}...Y_{eN}$, where N is the total of such emitters. These Y emitters lie along the Y axis and are aimed in the positive X direction. Again, these emitters are advantagesouly light-emitting diodes which produce infrared light in response to an input electrical signal. In summary, the X and Y emitters respectively direct their light towards sides 20T and 20R of frame 20. It is apparent that the total number, M, of X emitters is not necessarily equal to the total number, N, of Y emitters; a non-square emitter array, of course, results from the fact that the associated display itself is non-square. This aspect will be further discussed with respect to FIG. 2A.

Now, mounted on side 20T of frame 20 is a first linear array 50 of light detectors, designated from left to right as $X_{dl}...X_{dm}...X_{dM}$, where again M is the total number of such detectors. These detectors, of course, are designated as X detectors. These detectors face the negative Y direction and are therefore capable of receiving light from the X emitters; each X detector principally receiving light from only one associated X emitter. Under normal conditions it is recommended that the horizontal detectors be located on the upper portion of the associated frame in order to reduce the possibility of inadvertent operation by ambient light. In a similar manner, mounted on side 20R of frame 20 is a second linear array 150 of light detectors, designated from bottom to top as $Y_{dl}...Y_{dn}...Y_{dN}$, where again N is the total number of such detectors. These Y detectors face the negative X direction and are capable of receiving light from the Y emitters; each Y detector principally receiving light from only one associated Y emitter. In summary, the X and Y detectors receive light from emitters which are respectively mounted on sides 20B and 20L. It is apparent that the numbers of X and Y emitters are respectively equal to the numbers of X and Y detectors. These X and Y detectors are advantageously light-detecting diodes which produce an electrical signal in response to incident infrared light.

Associated with the X emitters is driving circuit 40, while associated with the Y emitters is driving circuit 140. Further, associated with and responsive to the X detectors is detecting circuit 60, while associated with and responsive to the Y detectors is detecting circuit 160. As will be shown with reference to FIG. 2A, driving circuits 40 and 140 may include common elements while detecting circuits 60 and 160 may also include common elements. Therefore, the combination comprising driving circuits 40 and 140 is designated overall driving circuit 240 while the combination comprising detecting circuits 60 and 160 is designated overall detecting circuit 260.

According to the present invention, driving circuit 240 sequentially pulses the X and Y emitters in repeating cycles in such a manner that at least one X directed light pulse and at least one Y directed light pulse intersects every coordinate location $(m, n)$ during each scan cycle; there being $M \times N$ coordinate locations.

If during a given scan cycle a passive stylus, such as wooden pointer 210, presses against display 200, then a pair of crossing light pulses will be blocked and, therefore, will not reach their associated detectors; in other words, no light pulse reaches these detectors during the given scan cycle. In the given example, point A has the coordinate location given by (4,6). Therefore, the light pulse from the fourth X emitter fails to reach the fourth X detector while the light pulse from the sixth Y emitter fails to reach the sixth Y detector. Detecting circuit 260, which responds to the two detector arrays, then determines which particular X and Y detectors failed to receive a light pulse during the given cycle. Circuit 260 then provides in binary form, for instance, the X and Y coordinates of the interrupting pointer.

This coordinate information can then be coded into appropriate form and transmitted over telephone lines, for instance, to remote processing equipment, such as a computer. The computer will process the incoming information and then send back an appropriate command to the display apparatus in order to effect a change in the displayed information, if such is the case.

It will be apparent to those skilled in the art that sequential pulsing allows for the application of high instantaneous power driving levels to the emitters. This, of course, yields high detector output signals for driving the associated detecting circuit. In other words, improved signal-to-noise performance is achieved.

Figure 2B:
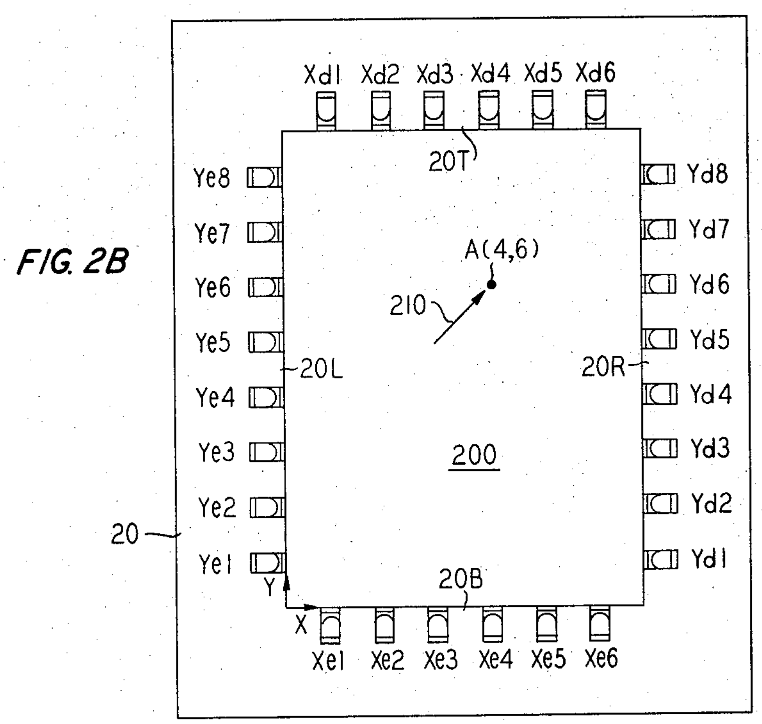
Figures 1, 2A, 2C:
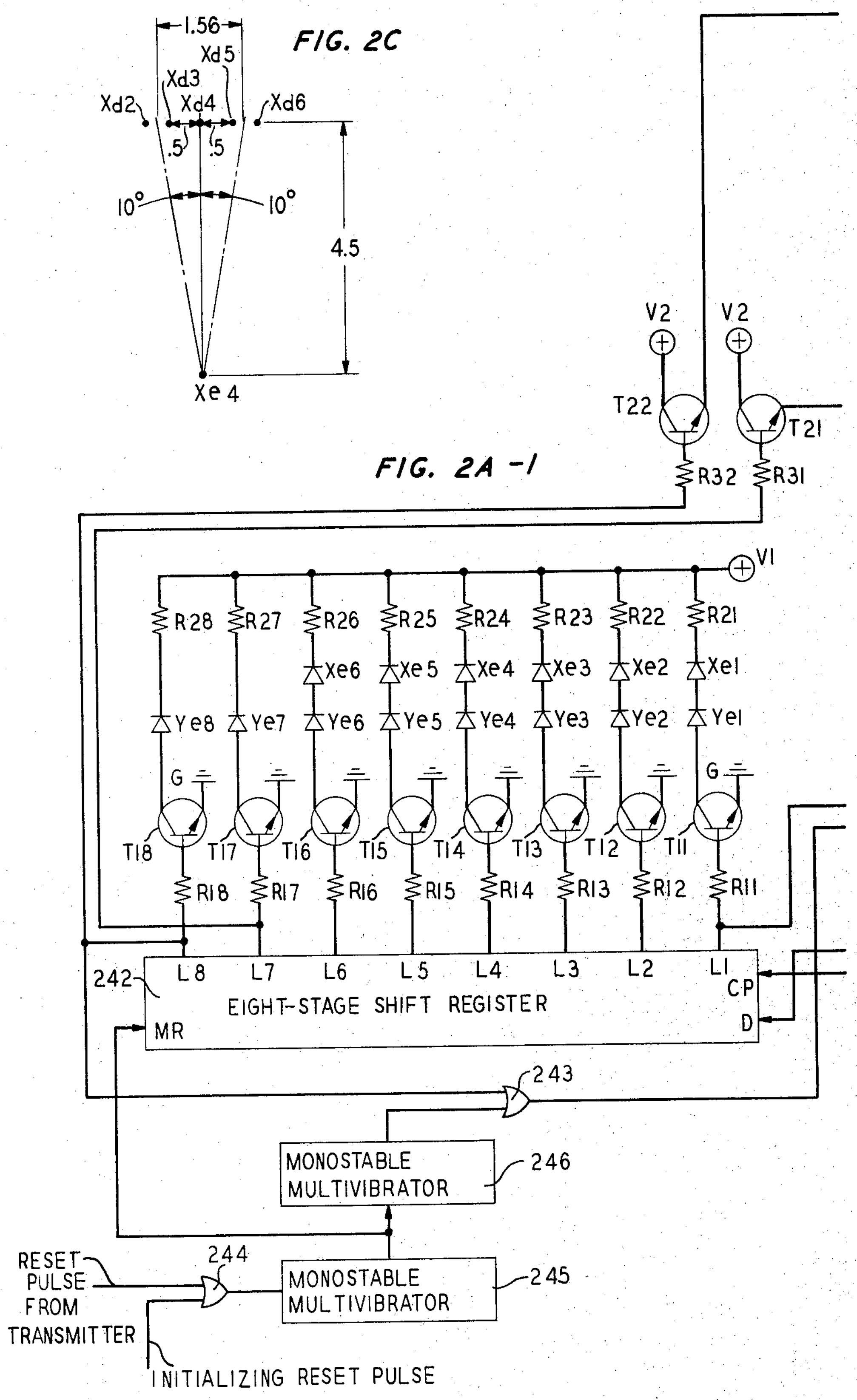
Figures 2, 2A:
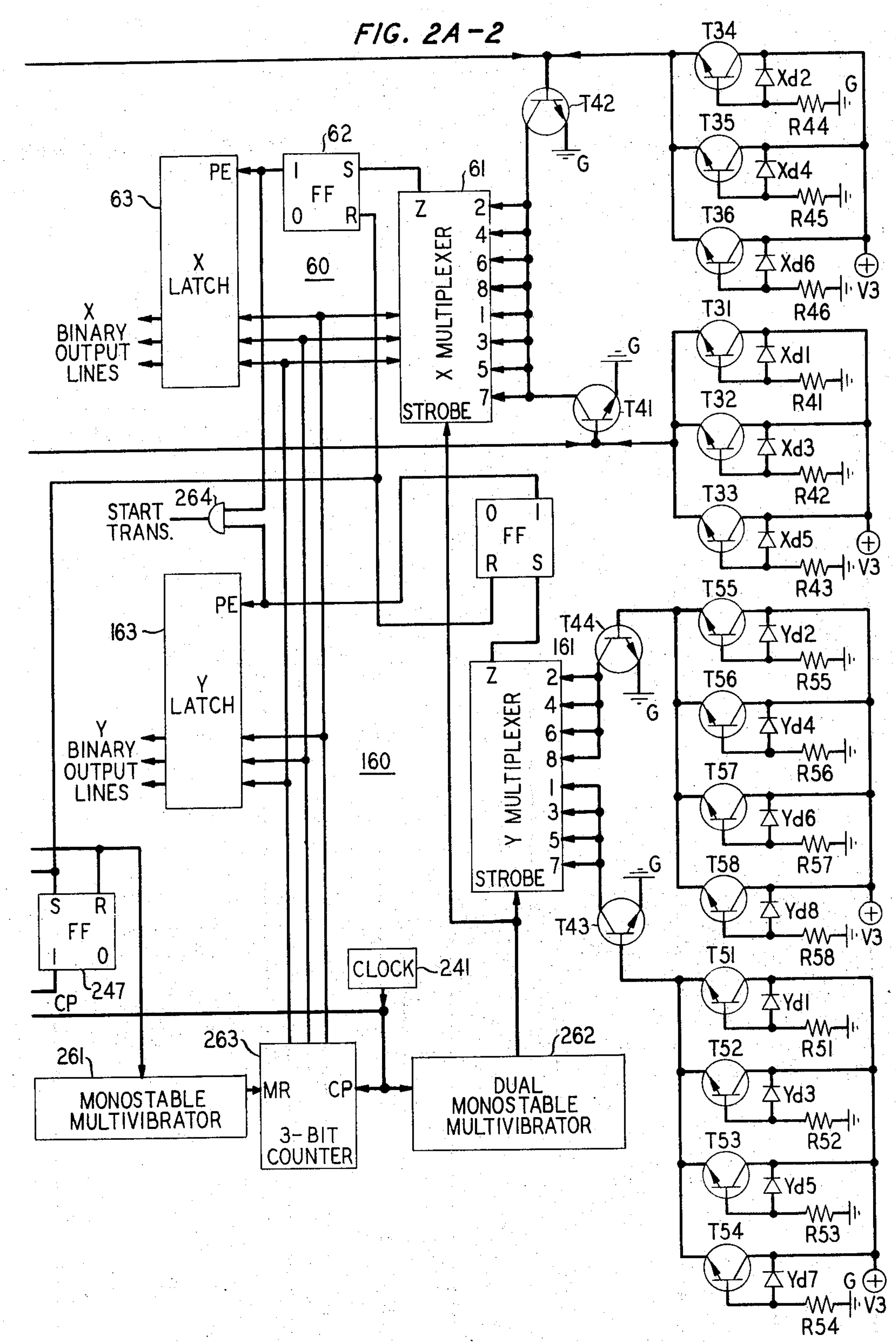

FIG. 2A shows a detailed embodiment of coordinate detection system 10, while FIG. 2B shows associated frame 20. From FIG. 2B it is apparent that frame 20, which is located adjacent to associated display 200, has first and second linear emitter arrays 30 and 130 respectively mounted on sides 20B and 20L thereof. Arrays 30 and 130 respectively include emitters $X_{el-6}$ and $Y_{el-8}$; in this case, therefore, $M = 6$ and $N = 8$. Further, first and second linear detector arrays 50 and 150 are respectively mounted on sides 20T and 20R of frame 20. Arrays 50 and 150 respectively include detectors $Y_{dl-6}$ and $Y_{dl-8}$. It will be recalled that each emitter is principally aimed at only one associated detector. Shown on the lower left-hand portion of frame 20 are X and Y coordinate axes. The emitters and detectors of FIG. 2B are symbolically represented as diodes in FIG. 2A.

According to the specific embodiment of FIG. 2A, overall driving circuit 240 comprises clock 241, shift register 242, OR gates 243 and 244, monostable multivibrators 245 and 246, and flip-flop 247. As will become more apparent, X driving circuit 40 and Y driving circuit 140 have all their elements in common and, therefore, are one and the same.

As before, overall detecting circuit 260 comprises X detecting circuit 60, Y detecting circuit 160, and the following elements which are common to these two circuits; monostable multivibrator 261, dual monostable multivibrator 262, counter 263, and AND gate 264. Further, X detecting circuit 60 includes multiplexer 61, flip-flop 62, and latch 63, while Y detecting circuit 160 includes multiplexer 161, flip-flop 162, and latch 163. It should be noted that detecting circuits 60 and 160 include similar elements; however, these circuits are not one and the same.

Now, connected to the first output line (L1) of shift register 242 is the series combination including resistor R11, driving transistor T11, emitters $X_{el}$ and $Y_{el}$, and resistor R21. In a similar manner, the second through sixth output lines (L2 through L6) have associated therewith resistors R12–16, transistors T12–16, emitters $X_{e2-6}$ and $Y_{e2-6}$, and resistors R22–26. However, connected to the seventh output line (L7) of shift register 242 is the series combination including resistor R17, transistor T17, only one emitter $Y_{e7}$, and resistor R27. A similar explanation applies to the eighth output line (L8) and its associated resistor R18, transistor T18, emitter $Y_{e8}$, and resistor R28. In other words, no X emitters are connected to the seventh and eighth output lines of shift register 242; this results from the fact that there are eight Y emitters while there are only six X emitters, resulting in a non-square array. Special circuitry which compensates for the missing seventh and eighth X emitters will be described hereinafter. The emitter terminals of transistors T11–18 are connected to ground G, while resistors R21–28 are connected to reference voltage V1. It should be noted that resistors R11–18 are identical, that transistors T11–18 are identical, and that resistors R21–28 are identical.

According to the present invention, therefore, each X emitter is connected in series with one associated Y emitter; this, of course, means that associated X and Y emitters are simultaneously pulsed in succession via the output lines of shift register 242. In this embodiment each X and Y emitter is pulsed only once during each scan cycle, as will be further discussed hereinafter. Connecting associated X and Y emitters in series and pulsing them simultaneously permits the unitary structure of overall driving circuit 260, as previously discussed with reference to FIG. 1. This feature, of course, leads to circuit economy and simplicity.

Now, connected to the input lines of multiplexer 61 are output transistors T41 and T42, these transistors respectively driving associated groups of input terminals 1, 3, 5 and 7 and 2, 4, 6 and 8. Transistor T41 is responsive in part to three parallel circuits, the first circuit including detector $X_{dl}$, transistor T31, and resistor R41, connected as shown. A similar explanation applies to the other two circuits which include detectors $X_{d3,5}$, transistors T32–33, and resistors R42–43. In a similar manner, transistor T42 is also responsive in part to three parallel circuits, these three circuits including detectors $X_{d2,4,6}$, transistors T34–36, and resistors R44–46. The collector terminals of transistors T31–36 are connected to reference voltage V3, while resistors R41–46 and the emitter terminals of transistors I41–42 are connected to ground G. Again, transistors T31–36 are identical, resistors R31–36 are identical, and transistors T41–42 are identical. The value of resistors R41–46 is advantageously chosen so that ambient light does not tend to cause inadvertent operation of the detectors.

Similarly, connected to the input lines of multiplexer 161 are transistors T43 and T44, these transistors respectively driving associated groups of input terminals 1, 3, 5 and 7 and 2, 4, 6 and 8. In this case, however, transistor T43 is responsive to four parallel circuits, the first circuit including detector $Y_{dl}$, transistor T51, and resistor R51, connected as shown. A similar explanation applies to the other three circuits which include detectors $Y_{d3,5,7}$, transistors T52–54, and resistors R52–54. Transistor T44 is also responsive to four parallel circuits, these four circuits including detectors $Y_{d2,4,6,8}$, transistors T55–58, and resistors R55–58. Again, the collector terminals of transistors T51–58 are connected to reference voltage V3, while resistors R51–58 and the emitter terminals of transistors T42–44 are connected to ground G. It should be apparent that transistors T51–58 are identical to transistors T31–36, that resistors R51–58 are identical to resistors R41–46, and that transistors T43–44 are identical to transistors T41–42.

To compensate for missing emitter $X_{e7}$, the seventh output line (L7) of shift register 242 is connected to transistor T41 of detecting circuit 60 via the series combination including resistor R31 and transistor T21. Similarly, the eighth output line (L8) is connected to transistor T42 of detecting circuit 60 via the series combination including resistor R32 and transistor T22. The collector terminals of transistors T31–32 are connected to reference voltage V2. Now, as far as multiplexer 61 is concerned, there do exist emitters $X_{e7,8}$ and associated detectors $X_{d7,8}$ where, in fact, no such emitters and detectors exist. In other words, multiplexer 61 is made to think that there exist detectors $X_{d7,8}$ which always detect light from associated emitters $X_{e7,8}$. Again, resistors R31–32 are identical and transistors T31–32 are identical.

The grouping of the detectors is now explained with reference to FIGS. 2B and 2C. It will be apparent to those skilled in the art that each emitter exhibits a finite non-zero beam divergence angle. For illustrative purposes it is assumed that this angle is 20° and that the diode spacing is 0.5 inch. Recalling that there are six X emitters and eight Y emitters, the internal dimensions of frame 20 then become 3.5 inches along the X axis and 4.5 inches along the Y axis. In other words, the distance between the X emitters and the X detectors is 4.5 inches, while the distance between the Y emitters and the Y detectors is 3.5 inches, as shown in FIG. 2B. Using well-known trigonometric relations, it is determined that the beam from each X emitter covers 1.56 inches along the X detector array mounted on side 20T. Therefore, a light pulse from emitter $X_{e4}$ is incident not only on associated detector $X_{d4}$ but also incident on two other detectors, as shown in FIG. 2C. In this case, therefore, three adjacent X detectors are capable of responding to incident light from a single X emitter. Now, alternate X detectors can be connected to a common output transistor. For instance, detectors $X_{d1,3,5}$ are connected to transistor T41. This is possible since only one detector per group sees a light pulse from its associated emitter at any given instant. As mentioned above, transistor T42 responds in part to detectors $X_{d2,4,6}$. In addition, transistors T41–42 also respond to their associated compensating circuits, as previously explained. Further, transistor T43 responds to detectors $Y_{d1,3,5,7}$, while transistor T44 responds to detectors $Y_{d2,4,6,8}$. The resulting circuit economy and simplicity with regard to these output transistors is apparent.

Overall system resolution is a function of the diode spacing. It should be noted, however, that if the ability to point with a finger, a pencil, or a wooden pointer is desired, then high system resolution is not necessary or justified.

The characteristics of each circuit element are now explained with reference to FIG. 2A and the following table.

TABLE

| Element | Input Terminals(s) | Output Terminal(s) | Functional Explanation |
|---|---|---|---|
| AND gate **264** | Two | One | When both inputs are high, the output is high. |
| Clock **241** | | One | Provides periodic clock pulses. |
| Counter **263** | One clock pulse (CP) One master reset (MR) | Three | A three-bit binary counter which counts from **1** to **8** in repeating cycles in response to input clock pulses; however, when the master reset input is high, the counter is reset to the one count. |
| Dual monostable multivibrator **262** | One | One | When the input is high, the output, after a given delay, goes high for a given duration. |
| Flip-flops **62, 162** and **247** | One set (S) One reset (RS) | One | When the set input is high, the output is high; when the reset input is high, the output is low. |
| Latch **63, 163** | Three counter One parallel enable (PE) | Three | When the PE input is low, the previously stored information remains on the three output lines; however, when the PE input is high, the corresponding count of counter **263** is stored and appears on the three output lines. |
| Mono-stable multi-vibrator **245, 246** and **261** | One | One | Upon the application of an appropriate input signal, the output immediately goes high for a given duration. |
| Multi-plexer **61, 161** | One strobe Eight detector lines Three counter lines | One Z | When the strobe input is high, the multiplexer interrogates the detector line corresponding to the count of counter **263**; if the particular detector line selected at that instant is high, then the Z output goes high; however, the Z output is low whenever strobe input is low. |
| OR gate **243,244** | Two | One | When either input is high, the output is high. |
| Shift register **242** | One clock pulse (CP) One data (D) One master reset (MR) | Eight lines (L1-8) | When a clock pulse appears on the CP input, the signal appearing on the data input is loaded into the first stage while the signal already stored is shifted to the succeeding stage; whenever the MR input is high, all line outputs are made low. |

The operation of coordinate detection system 10 is started by applying to OR gate 244 either a local initializing reset pulse or a reset pulse from an associated bit transmitter. OR gate 244 then actuates monostable multivibrator 245 which resets shift register 242. In this embodiment, monostable multivibrator 246 is actuated at the end of the pulse from multivibrator 245. The output of multivibrator 246 is applied to OR gate 243 which, in turn, sets flip-flop 247. Upon the application of a clock pulse to the CP input of shift register 242, the high output of flip-flop 247 is loaded onto the first stage of shift register 242. This signal which is loaded onto the first stage of shift register 242 appears on the first output line (L1) and resets flip-flop 247. Therefore, no further signals are loaded onto shift register 242. It will be apparent to those skilled in the art that the signal appearing on the first output line (L1) causes actuation of emitters $X_{el}$ and $Y_{el}$. This signal also actuates monostable multivibrator 261 which, in turn, resets counter 263 to the binary number 1. Therefore, at this point, the signal appearing on the first output line of shift register 242 pulses emitters $X_{el}$ and $Y_{el}$ while counter 263 provides a binary 1 count. Thereafter, successive clock pulses shift the stored signal to succeeding stages of shift register 242, while simultaneously the count of counter 267 is advanced in intervals of 1. Each time that the stored signal reaches a succeeding stage and, therefore, appears on the corresponding output line, the associated X and Y emitters are simultaneously pulsed. When the signal reaches the eighth stage and, therefore, appears on the eighth output line, flip-flop 247 is again set via OR gate 243 to restart the scan cycle.

Returning now to the previously cited example, wooden pointer 210 presses against display 200 at point A, which has the coordinates given by $X = 4$ and $Y = 6$. When the stored signal reaches the fourth output line of shift register 242 to actuate the associated emitters, emitter $X_{e4}$ is pulsed but its light pulse is blocked by pointer 210. Therefore, detector $X_{d4}$ fails to receive this pulse. At this point dual monostable multivibrator 262 applies a high signal to the strobe input of multiplexer 261, thereby causing the multiplexer to look at the detector input which corresponds to the count of 4. This, in turn, causes the Z output to go high and set flip-flop 62. The parallel enable input of latch 63 then goes high and causes the present count of counter 263, i.e., the binary count of 4, to be loaded onto the latch and appear on its output lines. This information remains on the latch output lines until the next high parallel enable input signal. In other words, the output of latch 63 changes only when pointer 210 moves to a new point having a different X coordinate. In a similar manner, the count of 6 is loaded and appears on the output lines of latch 163. Once the X and Y coordinates of point A have been determined, AND gate 264 goes high in response to the high outputs of flip-flops 62 and 162 to indicate that transmission of this coordinate information is ready to begin. For example, the coordinate information appearing on the output lines of the latches can be coded and transmitted to remote processing apparatus, such as a computer. The computer will process this information and thereafter send back a command to the display apparatus to change the displayed information, if such is the case. Once the coordinate information is transmitted, a start signal is sent back from the transmitter and applied to OR gate 244 to begin operation of system 10.

Under normal circumstances, wooden pointer 210 remains at the same point for many scan cycles since the scan rate is generally high. Therefore, the coordinate information appearing on the latch outputs will remain the same over these many cycles.

As mentioned before, in order to reduce interference from ambient light, the X detectors can advantageously be placed on side 20T of frame 20 and, in addition, the values of resistors R41–46 and R51–58 can be appropriately chosen. To further reduce the effects of ambient light, the emitters and detectors can be recessed into the frame. Further, a dark red plastic filter which is transparent to infrared light and opaque to visible light can be placed in front of the emitters and detectors.

The driving and detecting circuits can advantageously be placed directly on the frame adjacent to their associated emitters and detectors. This is possible since most of the elements of system 10 can be provided in integrated circuit form. This placement of the circuitry eliminates the problems associated with the transmission of small amplitude electrical signals on long wires and, in addition, reduces the number of external wires attached to the frame.

The present coordinate detection system is applicable to remote cursor schemes, the drawing of smooth lines, information retrieval systems, computer learning schemes, calculator schemes, air traffic control uses, etc. In most computer interaction applications, such as computer learning, there should be included means associated with either the X or Y detecting circuit for detecting the lifting of the passive stylus from the display.

The circuit allows only one coordinate location to be transmitted at a time. A second location cannot be transmitted until the finger is completely lifted off the face of the screen and returned for another point indication.

While the arrangement according to this invention for determining the spatial coordinates of a passive stylus has been described in terms of a specific embodiment, it will be apparent to those skilled in the art that many modifications are possible within the spirit and scope of the disclosed principle.

What is claimed is:

1. A coordinate detection system wherein the interruption of crossing light pulses by a passive stylus is used to determine a coordinate location, said system comprising:

a rectangular frame;

first and second linear arrays of light-emitting means respectively mounted along two adjacent internal edges of said rectangular frame;

third and fourth linear arrays of light-detecting means respectively mounted along the remaining two adjacent internal edges of said rectangular frame, each detecting means principally receiving light from one associated emitting means;

means for causing said light-emitting means to generate light pulses in repeating scan cycles so that at least one X-directed light pulse and at least one Y-directed light pulse intersect each said coordinate location during each said scan cycle; and means responsive to said light-detecting means for determining during each cycle which light-detecting means failed to receive a light pulse from their associated light-emitting means, thereby indicating the coordinate location of said interfering stylus.

2. The system of claim 1 wherein said light-emitting means are of the type which convert an input electrical signal to light and wherein said light-detecting means are of the type which convert incident light to an output electrical signal.

3. The system of claim 2 wherein said light-emitting means and light-detecting means are respectively light-emitting diodes and light-detecting diodes.

4. The system of claim 1 wherein said light-emitting means and light-detecting means are respectively infrared light-emitting means and infrared light-detecting means.

5. The system of claim 4, further comprising an infrared filter located in front of each light-emitting and light-detecting means.

6. The system of claim 1 wherein said sequentially operable means further comprises means for simultaneously pulsing associated light-emitting means from each of said first and second linear arrays.

7. The system of claim 3 wherein corresponding light-emitting diodes from said first and second linear arrays are connected in series.

8. The system of claim 7 wherein said sequentially operable means includes:

a clock which provides periodic timing pulses; and a shift register having a plurality of stages corresponding in number to the maximum number of light-emitting diodes in either of said first or second arrays, said shift register being responsive to said clock for sequentially pulsing said serial combinations of light-emitting diodes.

9. The system of claim 3 wherein said coordinate location indicating means includes:

a clock which provides periodic timing pulses;

a binary counter responsive to said clock whose count increases with each clock pulse;

means jointly responsive to said light-detecting diodes, said clock, and said counter for interrogating at each clock pulse the light-detecting diode which corresponds to the count of said counter; and means jointly responsive to said counter and said interrogating means for indicating which light-detecting diodes, if any, failed to receive light from their associated light-emitting diodes.

10. The system of claim 1 further comprising amplifying circuitry and means for connecting the outputs of selected light-detecting means from each of said third and fourth linear arrays to said amplifying circuitry in such a manner that only one light-detecting means per group receives light at any given instant.

11. The system of claim 1 wherein said sequentially operable means and said coordinate location indicating means are also mounted on said rectangular frame.

* * * * *